(12) United States Patent
Hofmeister

(10) Patent No.: US 6,231,297 B1
(45) Date of Patent: May 15, 2001

(54) SUBSTRATE TRANSPORT APPARATUS WITH ANGLED ARMS

(75) Inventor: Christopher A. Hofmeister, Hampstead, NH (US)

(73) Assignee: Brooks Automation, Inc., Chelmsford, MA (US)

( * ) Notice: Subject to any disclaimer, the term of this patent is extended or adjusted under 35 U.S.C. 154(b) by 0 days.

(21) Appl. No.: 08/786,708

(22) Filed: Jan. 21, 1997

Related U.S. Application Data

(63) Continuation-in-part of application No. 08/549,995, filed on Oct. 27, 1995, now Pat. No. 5,647,724.

(51) Int. Cl.[7] .................................................. B25J 18/02
(52) U.S. Cl. ................................... 414/744.5; 74/490.01; 414/937; 901/15
(58) Field of Search ............................. 414/744.5, 744.6, 414/749, 752, 935, 937, 939; 901/15; 74/490.08, 490.09, 490.01

(56) References Cited

U.S. PATENT DOCUMENTS

| | | |
|---|---|---|
| 1,190,215 | 7/1916 | Becker . |
| 2,282,608 | 5/1942 | Rempel . |
| 3,730,595 | 5/1973 | Yakubowski ........................ 302/2 R |
| 3,768,714 | 10/1973 | Applequist et al. ..................... 226/37 |
| 3,823,836 | 7/1974 | Cheney et al. ................... 214/16.4 R |
| 3,874,525 | 4/1975 | Hassan et al. ....................... 214/17 B |
| 4,062,463 | 12/1977 | Hillman et al. ....................... 214/301 |
| 4,109,170 | 8/1978 | Fujita et al. ......................... 310/68 R |
| 4,208,159 | 6/1980 | Uehara et al. ......................... 414/225 |
| 4,666,366 | 5/1987 | Davis .................................... 414/749 |
| 4,721,971 | 1/1988 | Scott ..................................... 354/105 |
| 4,730,975 | 3/1988 | Munakata .............................. 414/735 |
| 4,907,467 | 3/1990 | Toyoda et al. ........................... 74/479 |
| 4,909,701 | 3/1990 | Hardegen et al. ..................... 414/749 |
| 4,951,601 | 8/1990 | Maydan et al. ....................... 118/719 |
| 5,151,008 | 9/1992 | Ishida et al. ....................... 414/744.5 |
| 5,180,276 | 1/1993 | Hendrickson ........................ 414/752 |
| 5,183,370 | * 2/1993 | Cruz ..................................... 414/416 |
| 5,270,600 | 12/1993 | Hashimoto ......................... 310/75 D |
| 5,333,986 | 8/1994 | Mizukami et al. ................... 414/217 |
| 5,421,695 | 6/1995 | Kimura .............................. 414/744.5 |
| 5,447,409 | 9/1995 | Grunes et al. ..................... 414/744.6 |
| 5,647,724 | 7/1997 | Davis, Jr. et al. ................. 414/744.5 |
| 5,788,447 | * 8/1998 | Yonemitsu et al. ............. 414/940 X |
| 5,789,878 | 8/1998 | Kroeker et al. ........................ 318/45 |

OTHER PUBLICATIONS

Patent Abstracts of Japan, Pub. No. 07227777, Aug. 29, 1995, "Carrier and Processing Device For Article to be Process" JP 06024095, 1 page.

* cited by examiner

*Primary Examiner*—Donald W. Underwood
(74) *Attorney, Agent, or Firm*—Perman & Green, LLP

(57) ABSTRACT

A substrate transport apparatus having a movable arm assembly, two substrate holders and a coaxial drive shaft assembly. In a first embodiment, the movable arm assembly has a general X-shaped section that has its center connected to the coaxial drive shaft assembly. The substrate holders are connected to different pairs of arm sections of the X-shaped section. The coaxial drive shaft assembly moves the arms of the X-shaped section relative to each other to move the two substrate holders in reverse unison motion between extended and retracted positions. A second embodiment the movable arm assembly has two generally wide V-shaped arms at a common axis of rotation. Each arm has two arm sections that are angled relative to each other at the common axis of rotation.

19 Claims, 6 Drawing Sheets

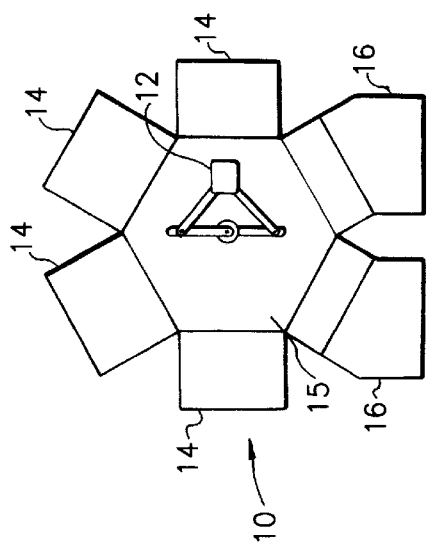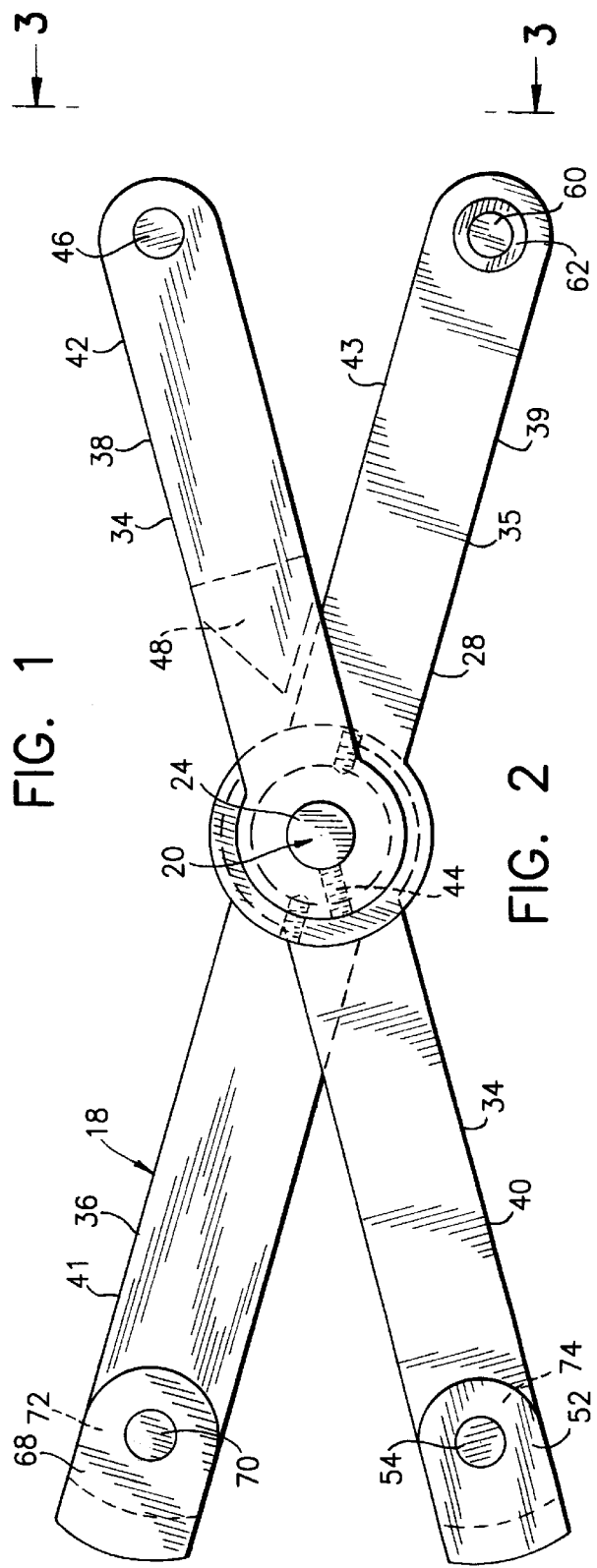

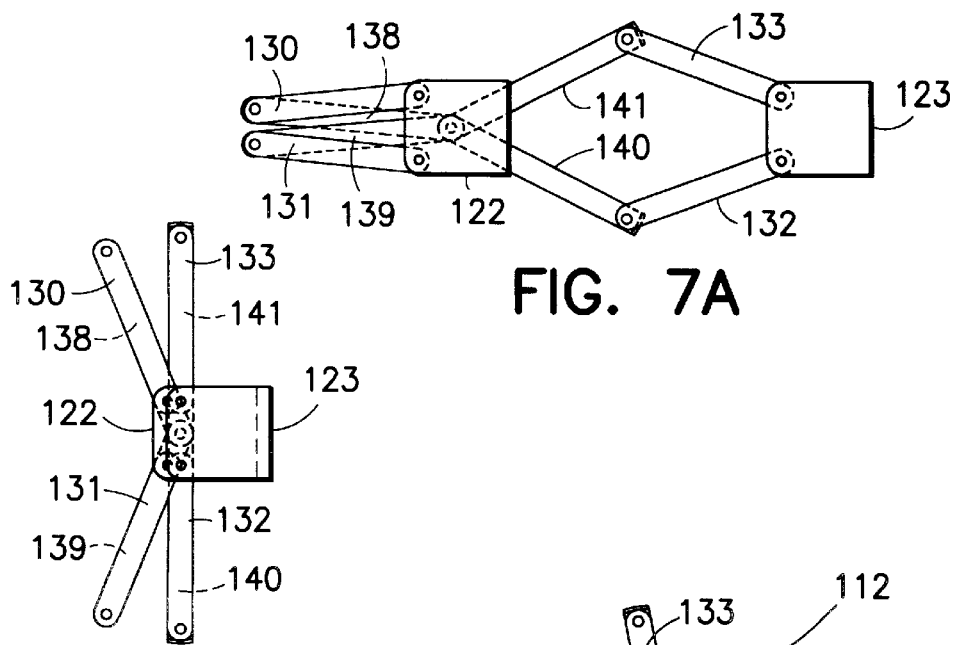
FIG. 7A
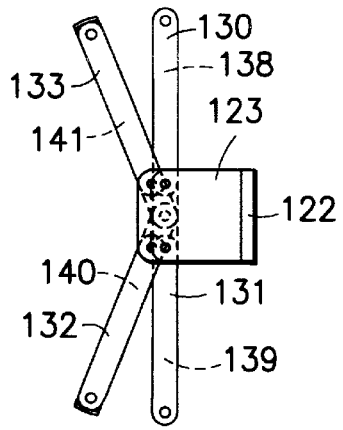
FIG. 7B
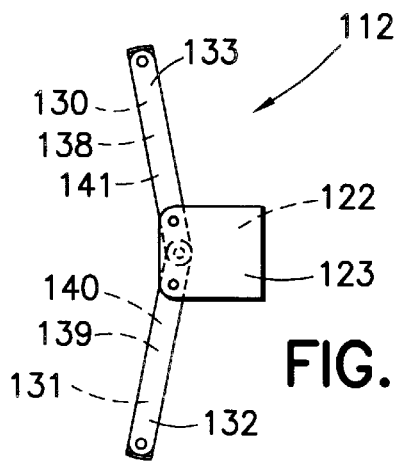
FIG. 7C
FIG. 7D
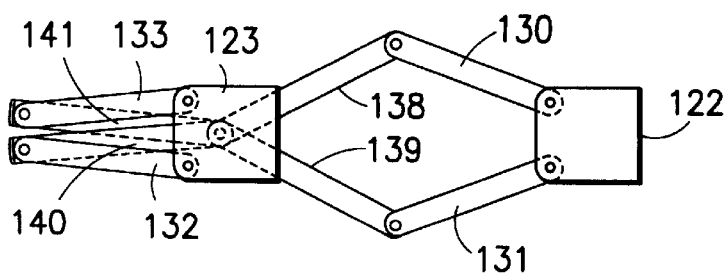
FIG. 7E

SUBSTRATE TRANSPORT APPARATUS WITH ANGLED ARMS

CROSS-REFERENCE TO RELATED APPLICATION

This is a continuation-in-part of U.S. patent application Ser. No. 08/549,995 filed Oct. 27, 1995, now U.S. Pat. No. 5,647,724.

BACKGROUND OF THE INVENTION

1. Field of the Invention

This invention relates to a substrate transport apparatus, and, more specifically, to an apparatus with multiple substrate holders and angled arms.

2. Prior Art

U.S. Pat. No. 4,951,601 discloses a substrate processing apparatus with multiple processing chambers and a substrate transport apparatus. U.S. Pat. No. 5,180,276 discloses a substrate transport apparatus with two substrate holders. U.S. Pat. No. 5,270,600 discloses a coaxial drive shaft assembly of a substrate transport apparatus.

SUMMARY OF THE INVENTION

In accordance with one embodiment of the present invention, a substrate transport apparatus is provided comprising a drive, a movable arm assembly, and two substrate holders. The movable arm assembly has a pair of proximal arms connected to the drive for rotation about an axis of rotation. Each proximal arm has at least two arm sections that are angled relative to the each other at an angle of less than 180°. The two substrate holders are connected to a different pair of ends of the pair of proximal arms.

In accordance with another embodiment of the present invention, a substrate transport apparatus is provided comprising a coaxial drive shaft assembly and a movable arm assembly. The coaxial drive shaft assembly has a first drive shaft and a second drive shaft. The movable arm assembly has four proximal arm sections fixedly connected to the coaxial drive shaft assembly. The four proximal arm sections, with their connection to the shaft assembly, form two rigid generally V-shaped arms. The two V-shaped arms are rotatable by the coaxial drive shaft assembly about an angle forming their general V-shape. Each of the proximal arm sections extends from the shaft assembly at a different height of the shaft assembly. First and third ones of the proximal arm sections form a first one of the general V-shaped arms and are fixedly connected to the first drive shaft. Second and fourth ones of the proximal arm sections form a second one of the general V-shaped arms and are fixedly connected to the second drive shaft.

In accordance with another embodiment of the present invention, a substrate transport apparatus is provided comprising a drive assembly, a movable arm assembly mounted to the drive assembly, and at least two substrate holders connected to the movable arm assembly. The movable arm assembly comprises arm sections connected to the drive assembly that form two generally wide V-shaped arms with a common axis of rotation proximate an angle in each of the V-shaped arms that form their general V-shape.

BRIEF DESCRIPTION OF THE DRAWINGS

The foregoing aspects and other features of the invention are explained in the following description, taken in connection with the accompanying drawings, wherein:

FIG. 1 is a schematic top plan view of a substrate processing apparatus having a substrate transport apparatus incorporating features of the present invention;

FIG. 2 is a top plan view of an X-shaped section of a movable arm assembly of the substrate transport apparatus shown in FIG. 1;

FIGS. 7A–7E are schematic top plan views of the substrate transport apparatus shown in FIG. 5 showing the movable arm assembly and substrate holders at five different positions.

DETAILED DESCRIPTION OF THE PREFERRED EMBODIMENTS

Figure 3:
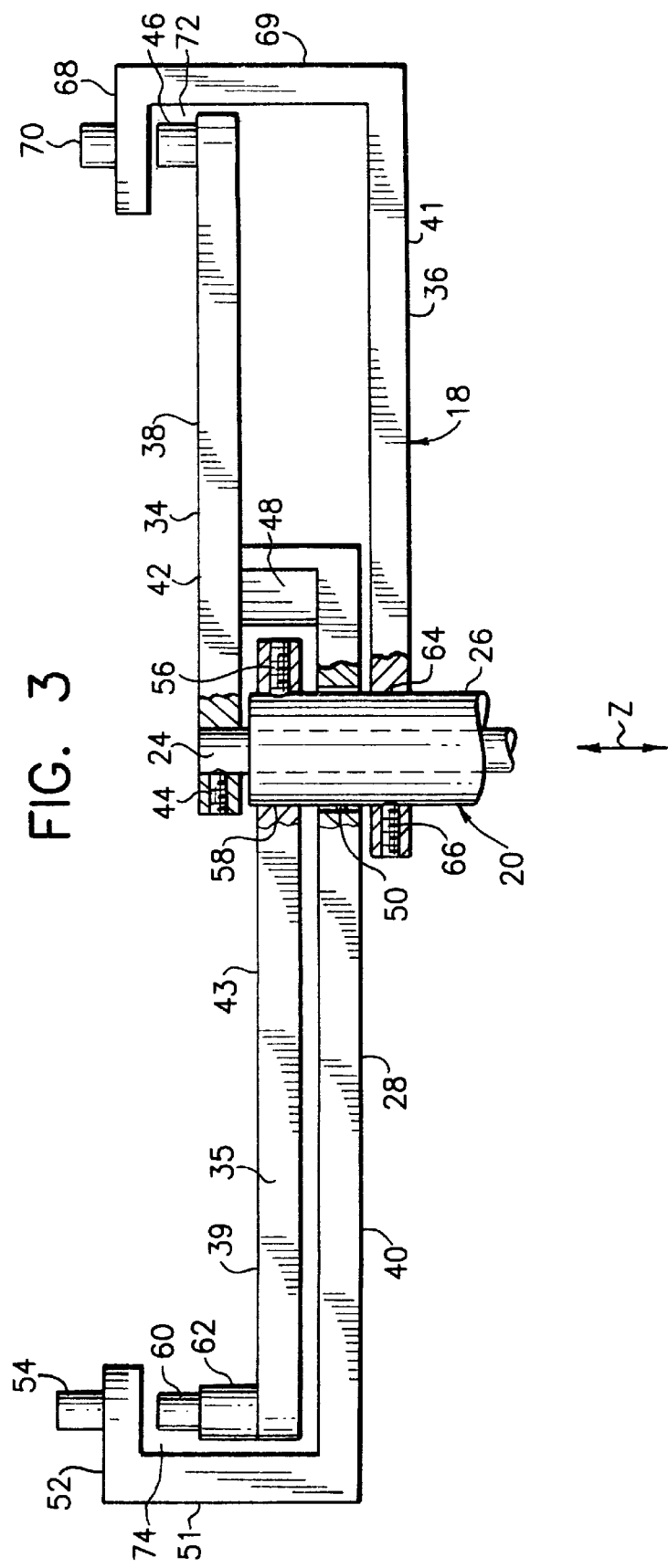
FIG. 3 is an end view of the X-shaped section shown in FIG. 2 with a partial cut away section.

Referring to FIG. 1, there is shown a schematic top plan view of a substrate processing apparatus 10 having a substrate transport apparatus 12 incorporating features of the present invention. Although the present invention will be described with reference to the embodiments shown in the drawings, it should be understood that the present invention may be embodied in many forms of alternative embodiments. In addition, any suitable size, shape or type of materials or elements could be used.

In addition to the substrate transport apparatus 12, the substrate processing apparatus 10 includes multiple substrate processing chambers 14 and substrates cassette elevators 16 connected to a chamber 15. The transport apparatus 12 is located, at least partially, in the chamber 15 and is adapted to transport planar substrates, such as semiconductor wafers or flat panel displays, between and/or among the chambers 14 and elevators 16. In alternate embodiments, the transport apparatus 12 could be used in any suitable type of substrate processing apparatus.

Figure 4A:
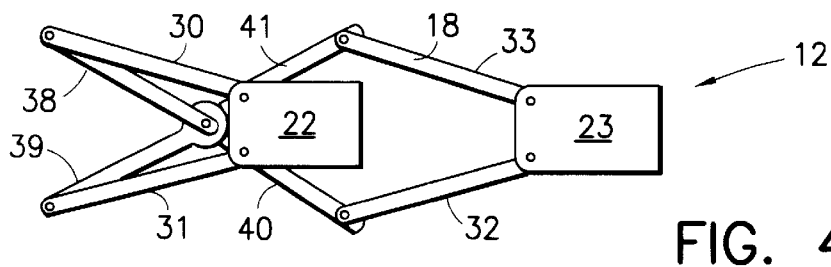
FIGS. 4A–4E are schematic top plan views of the substrate transport apparatus shown in FIG. 1 showing the movable arm assembly and the substrate holders at five different positions.
Figure 4B:
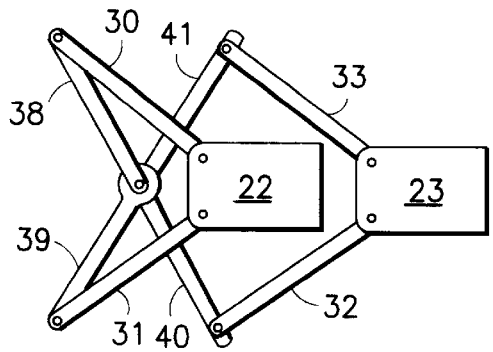
Figure 4C:
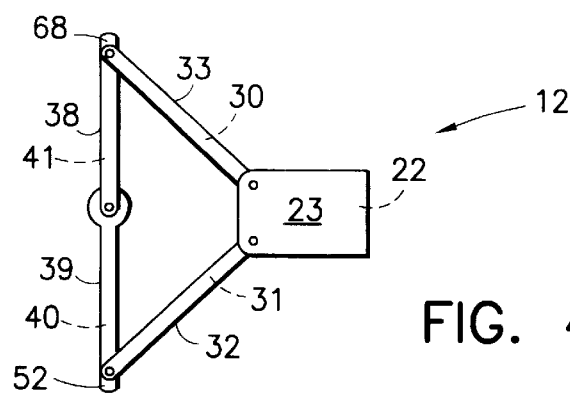
Figure 4D:
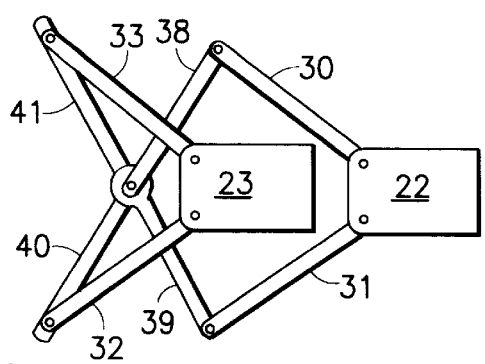
Figure 4E:
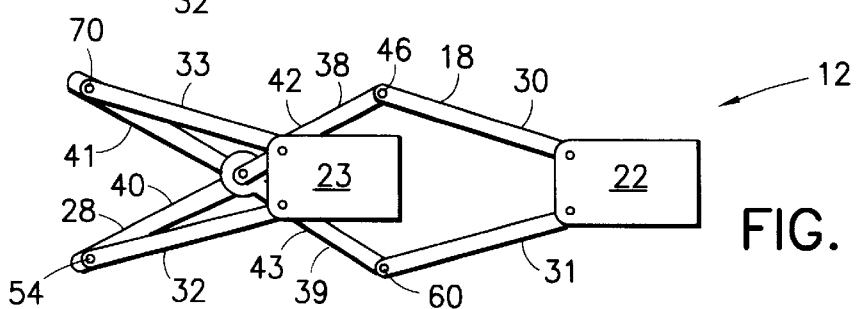

Referring also to FIGS. 2, 3 and 4E, the transport apparatus 12 generally comprises a movable arm assembly 18, a coaxial drive shaft assembly 20, and two substrate holders 22, 23. The coaxial drive shaft assembly 20 includes a first shaft 24 rotatably located inside a second shaft 26. The two shafts 24, 26 are axially rotatable in unison with each other in same directions and in opposite directions relative to each other and, are movable up and down with each other as indicated by arrow Z. One such coaxial drive shaft assembly is disclosed in U.S. Pat. No. 5,270,600 which is hereby incorporated by reference in its entirety. However, any suitable type of drive assembly could be used including a non-coaxial drive assembly or a coaxial drive assembly with more than two drive shafts.

The movable arm assembly 18 comprises a general X-shaped section 28 and four distal arms 30, 31, 32, 33. The distal arms 30, 31, 32, 33 connect the substrate holders 22, 23 to the X-shaped section 28. The X-shaped section 28 has three arm members 34, 35, 36 that form four proximal arm section 38, 39, 40, 41 of the two crossed arms 42, 43. The section 28 is referred to as being X-shaped. However, the two arms 42, 43 are movable relative to each other at their center connection to the drive shaft assembly 20. Thus, the X-shaped section 28 is a movable or reconfigurable X-shape. In one position, shown in FIGS. 1 and 4C, the X-shaped section looses its general X-shape because the two arms 42, 43 are directly aligned with each other. However, in all other non-aligned positions the section 28 has a general X-shaped profile. Thus, the section 28 is referred to herein as an X-shaped section for lack of a better descriptive term. The two crossed arms 42, 43 form the general X-shape. The first arm 42 comprises the first arm member 34 which forms the first and third arm sections 38, 40. The second arm 43 comprises the second and third arm members 35, 36 which form the second and fourth arm sections 39, 41.

As seen best in FIG. 3, the first arm member 34 is fixedly attached to the first drive shaft 24 by screw 44. The first arm section 38 has a pivot 46 at its distal end and is connected to the shaft assembly 20 at a first height. A stop 48 extends below the first arm section 38. The third arm section 40 is integral with the first arm section 38. The third arm section 40 has an aperture 50 that allows the drive shaft assembly 20 to pass therethrough. The third arm section 40 extends from the drive shaft assembly 20 at a third height on the assembly 20. Located at a distal end of the third arm section 40 is an upward extension 51 with an upper overhang section 52 having a pivot 54. The overhang section 52 extends inward towards the center of the X-shape. The second arm section 39 has an aperture 58 that allows the drive shaft assembly 20 to pass therethrough. The second arm section 39 is fixedly attached to the second drive shaft 26 by a screw 56. The second arm section 39 extends from the drive shaft assembly 20 at a second height on the assembly 20. Located at the distal end of the second arm section 39 is a pivot 60 on an upstanding post 62. The fourth arm section 41 has an aperture 64 that allows the drive shaft assembly 20 to pass therethrough. The fourth arm section 41 is fixedly attached to the second drive shaft 26 by a screw 66. The distal end of the fourth arm section 41 has an upward extension 69 with an upper overhang section 68 having a pivot 70. The fourth arm section 41 extends from the drive shaft assembly at a fourth height on the assembly 20. Thus, the four arm sections 38, 39, 40, 41 extend from the drive shaft assembly 20 at four different heights on the assembly 20. The third arm section 40 and the fourth arm section 41 form channels 72, 74 to allow the distal ends of the first and second arm sections 38, 39 to pass through.

As seen best in FIG. 4E, the first distal arm 30 has one end pivotably mounted on the first pivot 46 of the first arm section 38 and an opposite end pivotably mounted to the first substrate holder 22. The second distal arm 31 has one end pivotably mounted on the second pivot 60 of the second arm section 39 and an opposite end pivotably mounted to the first substrate holder 22. Thus, the first holder 22 is pivotably mounted to the pair of pivots 46, 60; one pivot from each of the crossed arms 42, 43 of the X-shaped section 28. The third distal arm 32 has one end pivotably mounted on the third pivot 54 of the third arm section 40 and an opposite end pivotably mounted to the second substrate holder 23. The fourth distal arm 33 has one end pivotably mounted on the fourth pivot 70 of the fourth arm section 41 and an opposite end pivotably mounted to the second substrate holder 23. Thus, the second holder 23 is pivotably mounted to the pair of pivots 54, 70; one pivot from each of the crossed arms 42, 43 of the X-shaped section 28. In alternate embodiments other types of connections of the distal arms to the X-shaped section 28 and/or the holders 22, 23 could be provided. Connectors or a connecting assembly different than the distal arms 30, 31, 32, 33 could also be provided.

The first pair of pivots 46, 60 and their corresponding distal arms 30, 31 are located in a first relative lower plane of movement. The first substrate holder 22 is also located in this first relative lower plane. The second pair of pivots 54, 70 and their corresponding distal arms 32, 33 are located in a second relative upper plane of movement. The second substrate holder 23 is also located in this second relative upper plane. In a preferred embodiment the first pair of distal arms 30, 31 has intermeshed gear sections at holder 22 for registry of movement to keep the holder 22 in a constant orientation. The second pair of distal arms 32, 33 also preferably has intermeshed gear sections at holder 23 for registry of movement to keep the holder 23 in a constant orientation. However, any suitable type of system to keep the holders 22, 23 properly orientated could be used.

The substrate holders 22, 23 are adapted to be inserted and removed from the chambers 14 and elevators. 16. The holders 22, 23 are adapted to hold substrates thereon and thereby allow the substrates to be moved between and/or among the chambers 14 and elevators 16. Suitable means are provided (not shown) for keeping the substrate holders aligned with the movable arm assembly 18 such that the holders 22, 23 are always pointed in an outward direction for proper straight insertion into a chamber or elevator. This can include the ends of the distal arms 30, 31, 32, 33 at the holders 22, 23 having intermeshed gear teeth or an S-band joint constraint, such as described in U.S. patent application Ser. No. 08/421,533 entitled "Articulated Arm Transfer Device", now U.S. Pat. No. 5,577,879 which is hereby incorporated by reference in its entirely. In alternate embodiments any suitable type of substrate holders or orientation constraint could be used.

Referring now to FIGS. 4A–4E, the operation of the substrate movement apparatus 12 will be described. FIG. 4C and FIG. 1 show the apparatus 12 at a home position. In this home position both drive shafts 24, 26 can be rotated in the same direction to rotate the holders 22, 23 in front of a selected one of the chambers 14 or elevators 16. In this home position, the upper holder 23 is located above the lower holder 22. Distal arm 33 is located over distal arm 30. Distal arm 32 is located over distal arm 31. First arm section 38 is located over the fourth arm section 41 except for overhang section 68. Second arm section 39 is located over the third arm section 40 except for overhang section 52.

FIG. 4A shows the upper holder 23 in an extended position with the lower holder 22 in a retracted position. FIG. 4B shows an intermediate position of the apparatus 12 between the home position shown in FIG. 4C and the upper holder extended position shown in FIG. 4A. In order to move between these two positions, the two drive shafts 24, 26 are axially rotated in reverse directions relative to each other. FIG. 4E shows the lower holder 22 in an extended position with the upper holder 23 in a retracted position. FIG. 4D shows an intermediate position of the apparatus 12 between the home position shown in FIG. 4C and the lower holder extended position shown in FIG. 4E. The two holders 22, 23 are moved in opposite unison between their extended positions and their home positions with the upper holder 23 moving in a plane above the lower holder 22. The movable arm assembly 18 allows sufficient room for the holder being retracted to move closer to the center of the X-shaped section. The stop 48 limits axial rotation of the two crossed arms 42, 43 relative to each other. The movable arm assembly 18 is designed to allow each arm 42, 43 to rotate about 160°. However, in alternate embodiments other degrees of rotation could be provided. The X-shaped section 28 has been designed to allow unobstructed movement of the arm sections 38, 39, 40, 41 between the positions shown in FIGS. 4A and 4E and unobstructed movement of the distal arms and holders in their two different relative planes of motion. This allows the two holders 22, 23 to be positioned on the same side of the assembly 18. The two pairs of distal arms 30, 31 and 32, 33 function as forearm sections for their respective substrate holders 22, 23. In alternate embodiments more than two substrate holders could be provided and/or, could be located on additional sides of the assembly 12. The drive shaft assembly 20 vertically moves the holders 22, 23 in direction Z (see FIG. 3) to align the holder to be extended with the opening of the intended receiving chamber 14 or elevator 16. Positioning the two holders 22, 23 on the same side of the assembly can speed-up throughput in the substrate processing apparatus 10. Positioning of the holders 22, 23 on the same side of the apparatus 12 is accomplished by allowing the holders to move along substantially parallel paths, one holder above the other, with one moving in a plane over the other.

Figure 5:
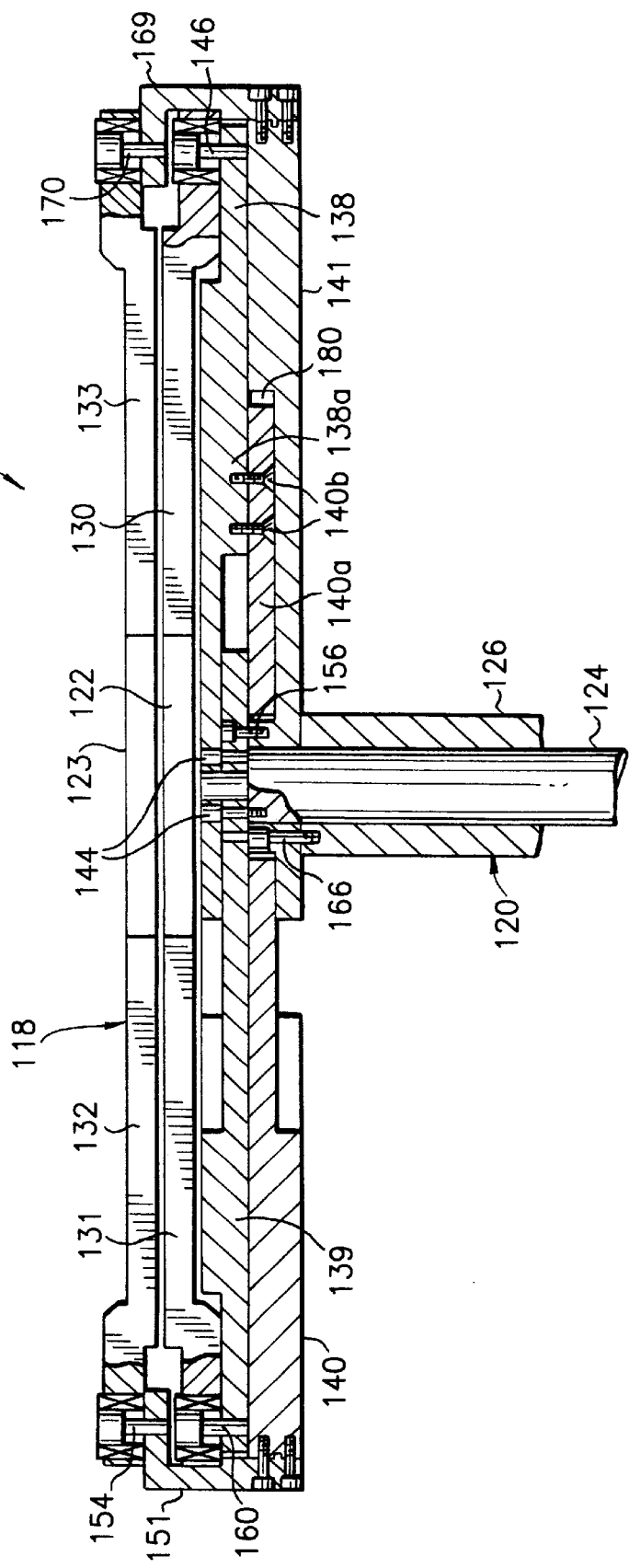
FIG. 5 is an end view with partial cut away sections of an alternate embodiment of the present invention.

Referring now to FIG. 5, there is shown an alternate embodiment of the present invention. The transport apparatus 112 has a coaxial drive shaft assembly 120 with two drive shafts 124, 126. The movable arm assembly 118 has four drive arms 138, 139, 140, 141 and four driven arms or forearms 130, 131, 132, 133. Two holders 122, 123 are attached to ends of the forearms 130, 131, 132, 133. In this embodiment, the second and fourth drive arms 139 and 141 are fixedly connected to each other by fasteners 156 (only one of which is shown) to form a first proximal arm. The fourth drive arm 141 is fixedly attached to the top of the outer drive shaft 126 by fasteners 166 (only one of which is shown). Thus, when the outer drive shaft 126 is moved, the second and fourth drive arms 139, 141 are moved. The third drive arm 140 has a section 140*a* that fasteners 140*b* are attached to. The fasteners 140*b* are also attached to section 138*a* of the first drive arm 138. This fixedly attaches the first drive arm 138 to the third drive arm 140 to form a second proximal arm. The fourth drive arm 141 has a pocket 180 to allow the section 140*a* to move therethrough. The first drive arm 138 is fixedly attached to the top of the inner drive shaft 124 by fasteners 144 (only two of which are shown). The third drive arm 140 has an extension 151 attached to it that has the pivot 154 thereon. Likewise, the fourth drive arm 141 has an extension 169 attached to it that has the pivot 170. The first and second drive arms 138, 139 also have pivots 146, 160, respectively. As seen in FIG. 5, the lower drive arm 141 is sized and shaped to pass beneath the upper drive arm 138. The lower drive arm 140 is sized and shaped to pass beneath the upper arm drive 139. The four forearms 130, 131, 132, 133 are mounted on the pivots 146, 154, 160, 170 with suitable bearings. This embodiment is more compact than the embodiment shown in FIG. 3 and is easier to manufacture. There is also virtually no chance that the drive arms will move relative to their respective drive shafts.

Figure 6:
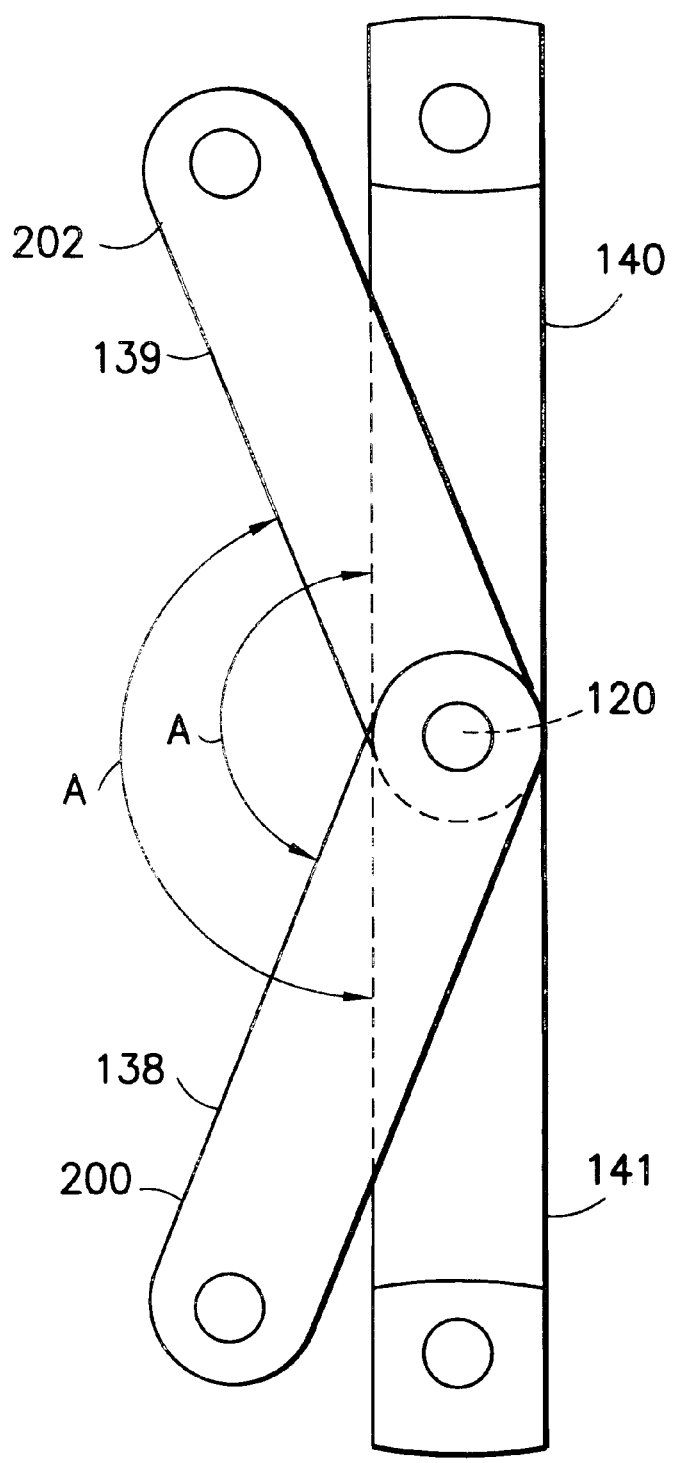
FIG. 6 is a schematic top plan view of the V-shaped arms of the movable arm assembly shown in FIG. 5.

Referring also to FIG. 6 a plan top view of the four drive arms 138, 139, 140, 141 are shown. Unlike the first embodiment shown in FIGS. 1–4, the four drive arms in this second embodiment do not form a general X-shape. Instead, the four drive arms 138, 139, 140, 141 form two generally wide V-shaped arms 200, 202. The first V-shaped arm 200 comprises the first drive arm 138 and the third drive arm 140. The second V-shaped arm 202 comprises the second drive arm 139 and the fourth drive arm 141. The two V-shaped proximal arms 200, 202 each has their two drive arms angled relative to each other at an angle of less than 180° as seen by angles A in FIG. 6. The angles A are the same and are fixed because the pairs of drive arms 138, 140 and 139, 141 in each V-shaped arm are respectively fixed to each other. Preferably, the angles A are about 160° to about 170°. However, the angles A could be any suitable angle between 120° and less then 180°. In an alternate embodiment, the pairs of drive arms 138, 140 and/or 139, 141 could be provided as a one-piece member.

Referring also to FIGS. 7A–7E, the operation of the substrate movement apparatus 112 will be described. FIG. 7C shows the apparatus 112 at a home position. In this home position both drive shafts 124, 126 (see FIG. 5) can be rotated in the same direction to rotate the holders 122, 123 in front of a selected one of the processing chambers or elevators. In this home position the upper holder 123 is located directly above the lower holder 122. Distal arm 133 is located over the distal arm 130. Distal arm 132 is located over the distal arm 131. The first drive arm 138 is located under the distal arms 133, 130 and over the fourth drive arm 141, except for the overhang section 168. The second drive arm 139 is located under the distal arms 132, 131 and over the third drive arm 140, except for the overhand section 152. Thus, as seen in FIG. 7C, the movable arm assembly is sized and shaped to locate both of the two substrate holders 122, 123 over the center of the drive arm assembly at the same time when the holders are in a fully retracted home position.

FIG. 7A shows the upper holder 123 in an extended position with the lower holder 122 in a retracted position. FIG. 7B shows an intermediate position of the apparatus 118 between the home position shown in FIG. 7C and the upper holder extended position shown in FIG. 7A. In order to move between these positions, the two drive shafts 124, 126 are axially rotated in reverse directions relative to each other.

FIG. 7E shows the lower holder 122 in an extended position with the upper holder 123 in a retracted position. FIG. 7D shows an intermediate position of the apparatus 118 between the home position shown in FIG. 7C and the lower holder extended position shown in FIG. 7E. The two holders 122, 123 are moved in opposite unison between their extended positions and their retracted positions with the upper holder 123 moving in a plane above the lower holder 122.

As seen in comparing FIG. 7C to FIG. 4C, the substrate holders 122, 123 in this second embodiment are closer to the axis of rotation of the drive assembly 120 than the holders 22, 23 in the first embodiment shown in FIG. 4C. This provides an advantage during rotation of the assembly 118. More specifically, as the assembly 118 is rotated between positions in front of the elevators and processing chambers, there is significantly less centrifugal forces applied to substrates on the holders 122, 123. Therefore, there is less chance that the substrates will move on the holders and be damaged. The V-shaped arms 200, 202, have been designed to allow unobstructed movement of the arms sections 138, 139, 140, 141 between the positions shown in FIGS. 7A and 7E and unobstructed movement of the distal arms and holders in their two different relative planes of motion. This allows the two holders 122, 123 to be positioned on the same side of the assembly. The two pairs of distal arms 130, 131 and 132, 133 function as forearm sections for their respective substrate holders 122, 123. In alternate embodiments more than two substrate holders could be provided and/or, could be located on additional sides of the assembly 112. The drive shaft assembly 120, can vertically move the holders 122, 123 in direction Z (see FIG. 5) to align the holder with the opening of the intended receiving chamber or elevator. Positioning the two holders 122, 123 on the same side of the apparatus 112 is accomplished by allowing the holders to move along substantially parallel paths, one holder above the other, with one moving in a plane over the other.

In another alternate embodiment, two drive shaft assemblies could be used; one extending upward into the chamber and one downward into the chamber. Referring to FIG. 1, because the driven arms can extend and retract in a single radial direction on one side of the drive shaft, the substrate holders can withdraw a substrate from one of the chambers 14 or elevator 16 and insert a substrate into the same chamber 14 or elevator 16 without rotating the substrate holders about the center axis of the drive shaft assembly. This can obviously save time in transporting substrates. The ability to have the driven arms and substrate holders on the same side of the drive shaft assembly is an important feature and improvement for the present invention.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A substrate transport apparatus comprising:
    a drive having a coaxial drive shaft assembly;
    a movable arm assembly having a pair of proximal arms connected to the coaxial drive shaft assembly for rotation about a common axis of rotation, each proximal arm having at least two arm sections that are angled relative to each other at an angle of less than 180°; and
    two substrate holders, each of the holders being connected to a different pair of ends of the pair of proximal arms, wherein the movable arm assembly includes two pairs of distal arms connecting the substrate holders to the different pairs of the ends of the proximal arms.

2. An apparatus as in claim 1 wherein the distal arms are pivotably connected to the ends of the proximal arms.

3. An apparatus as in claim 1 wherein the two substrate holders are located in parallel paths of extension and retraction with one path located directly above the other path.

4. An apparatus as in claim 1 wherein the at least two arm sections of each proximal arms comprise an upper arm section and a lower arm section, the lower arm section of a first one of the proximal arms is adapted to pass beneath the upper arm section of a second one of the proximal arms and, the lower arm section of the second proximal arm is adapted to pass beneath the upper arm section of the first proximal arm.

5. An apparatus as in claim 4 wherein the lower arm sections have overhang sections that project in an inward direction towards the drive.

6. A substrate transport apparatus comprising:
    a coaxial drive shaft assembly having a first drive shaft and a second drive shaft;
    a movable arm assembly with four proximal arm sections fixedly connected to the coaxial drive shaft assembly, the four proximal arm sections, with their connection to the shaft assembly, forming two rigid generally V-shaped arms, the two general V-shaped arms being rotatable by the coaxial drive shaft assembly about an angle that forms their general V-shape, each of the proximal arm sections extending from the shaft assembly at a different height of the shaft assembly, first and third ones of the proximal arm sections forming a first one of the general V-shaped arms and being fixedly connected to the first drive shaft and, second and fourth ones of the proximal arm sections forming a second one of the general V-shaped arms and being fixedly connected to the second drive shaft; and
    substrate holders connected to the movable arm assembly.

7. An apparatus as in claim 6 wherein the two V-shaped arms have a common axis of rotation.

8. An apparatus as in claim 6 wherein the movable arm assembly includes two pairs of distal arms connecting the substrate holders to different pairs of the proximal arm sections.

9. An apparatus as in claim 6 wherein two of the substrate holders are located in parallel paths of extension and retraction with one path located directly above the other path.

10. An apparatus as in claim 6 wherein two of the proximal arm sections have upper overhang sections that project towards the coaxial drive shaft assembly.

11. In a substrate transport apparatus having a drive assembly, a movable arm assembly mounted to the drive assembly, and at least two substrate holders connected to the movable arm assembly, wherein the improvement comprising:
    the movable arm assembly comprises arm sections connected to the drive assembly that form two generally wide V-shaped arms, the two V-shaped arms each having a vertex section that forms their general V-shape, wherein the drive assembly comprises a coaxial drive shaft assembly and the V-shaped arms are connected to the coaxial drive shaft assembly on a common axis of rotation, the common axis of rotation being located proximate the two vertex sections.

12. An apparatus as in claim 11 wherein one of the substrate holders is located in a plane above the other substrate holder.

13. A substrate transport apparatus comprising:
    a drive;
    a movable arm assembly having a pair of proximal arms connected to the drive for rotation about an axis of rotation, each proximal arm having at least two arm sections that are angled relative to each other at an angle of less than 180°; and
    two substrate holders, each of the holders being connected to a different pair of ends of the pair of proximal arms, wherein the pair of proximal arms is comprised of arm members and the drive has two coaxial drive shafts, and wherein one of the arm members is connected to a first one of the drive shafts and a second one and a third one of the arm members are connected to a second one of the drive shafts.

14. A substrate transport apparatus comprising:
    a drive;
    a movable arm assembly having a pair of proximal arms connected to the drive for rotation about an axis of rotation, each proximal arm having at least two arm sections that are angled relative to each other at an angle of less than 180°; and
    two substrate holders, each of the holders being connected to a different pair of ends of the pair of proximal arms, wherein the at least two arm sections of each proximal arm comprise an upper arm section and a lower arm section, the lower arm section of a first one of the proximal arms is sized and shaped to pass beneath the upper arm section of a second one of the proximal arms and, the lower arm section of the second proximal arm is sized and shaped to pass beneath the upper arm section of the first proximal arm.

15. In a substrate transport apparatus having a drive assembly with a coaxial drive shaft, a movable arm assembly mounted to the coaxial drive shaft of the drive assembly, and at least two substrate holders connected to the movable arm assembly, the moveable arm assembly being moveable to extend and retract the substrate holders and move the substrate holders relative to each other, wherein the improvement comprises:

the moveable arm assembly being sized and shaped to locate both of the two substrate holders over the center of the drive assembly at the same time when the holders are in a fully retracted home position.

16. An apparatus as in claim 1 wherein the moveable arm assembly is sized and shaped to locate both of the two substrate holders over a center of the drive at the same time when the holders are in a fully retracted home position.

17. An apparatus as in claim 9 wherein the moveable arm assembly is sized and shaped to locate both of the two substrate holders over a center of the coaxial drive shaft assembly at the same time when the holders are in a fully retracted home position.

18. A substrate transport apparatus comprising:

a movable arm assembly having a center rotational section with a coaxial drive shaft and proximal arms extending from the center rotational section, the proximal arms forming at least two angled shape arm sections, each angled shape arm section having portions which are angled relative to each other at an angle of less than 180°; and two substrate holders, each of the holders being connected to a different pair of ends of the two arm sections, wherein the proximal arms are connected to the coaxial drive shaft on a common axis of rotation, and wherein the movable arm assembly includes distal arms connecting the substrates holders to the different pairs of the ends of the two arm sections.

19. An apparatus for transferring objects, the apparatus comprising:

a first drive shaft;

a second drive shaft coaxially mounted with the first drive shaft;

substrate holders vertically spaced from one another; and a linkage connecting the substrate holders to the drive shafts, the linkage including proximal arms which, when viewed from a top plan view, each arm has opposite ends that extend in different directions angled relative to each other, the proximal arms being connected to the drive shafts, wherein the proximal arms have a common axis of rotation and are rotatable in reverse directions relative to each other about the common axis of rotation.

* * * * *